United States Patent [19]

Wilcox

[11] Patent Number: 4,656,327

[45] Date of Patent: Apr. 7, 1987

[54] SPOT WELDER WITH ELECTRODE CLAMP

[76] Inventor: Paul A. Wilcox, 2209 S. 109th St., West Allis, Wis. 53227

[21] Appl. No.: 768,844

[22] Filed: Aug. 23, 1985

[51] Int. Cl.$^4$ .............................................. B23K 11/10
[52] U.S. Cl. .............................. 219/86.21; 219/86.31; 219/90
[58] Field of Search ............... 219/86.21, 86.25, 86.31, 219/89, 90; 174/15 WF

[56] References Cited

U.S. PATENT DOCUMENTS

| 1,534,688 | 4/1925 | Collins | 219/75 |
| 2,651,701 | 9/1953 | Backen | 219/90 |
| 2,747,063 | 5/1956 | Waring | 219/90 |
| 4,208,566 | 6/1980 | Eghammer et al. | 219/86.31 X |

FOREIGN PATENT DOCUMENTS

| 575660 | 2/1946 | United Kingdom | 174/15 WF |
| 1075872 | 7/1967 | United Kingdom | 219/90 |

Primary Examiner—E. A. Goldberg
Assistant Examiner—C. M. Sigda
Attorney, Agent, or Firm—Fuller, Puerner & Hohenfeldt

[57] ABSTRACT

A portable spot welder includes a hand-held electrode clamp assembly. The hand-held clamp has a fixed electrode and a movable electrode adapted to be moved toward and away from the fixed electrode. A spring loaded toggle is used to pivot the movable electrode to clamp a workpiece between the electrodes to exert a predetermined and repeatable pressure. The invention includes an air cooling system. Air is forced through the electrical cables connecting the hand-held electrode clamp to the welder transformer. At the hand-held clamp, the air escapes to the atmosphere through passageways near the electrodes, thereby enabling heat generated within the cables and at the electrodes to be transferred to the flowing air.

5 Claims, 5 Drawing Figures

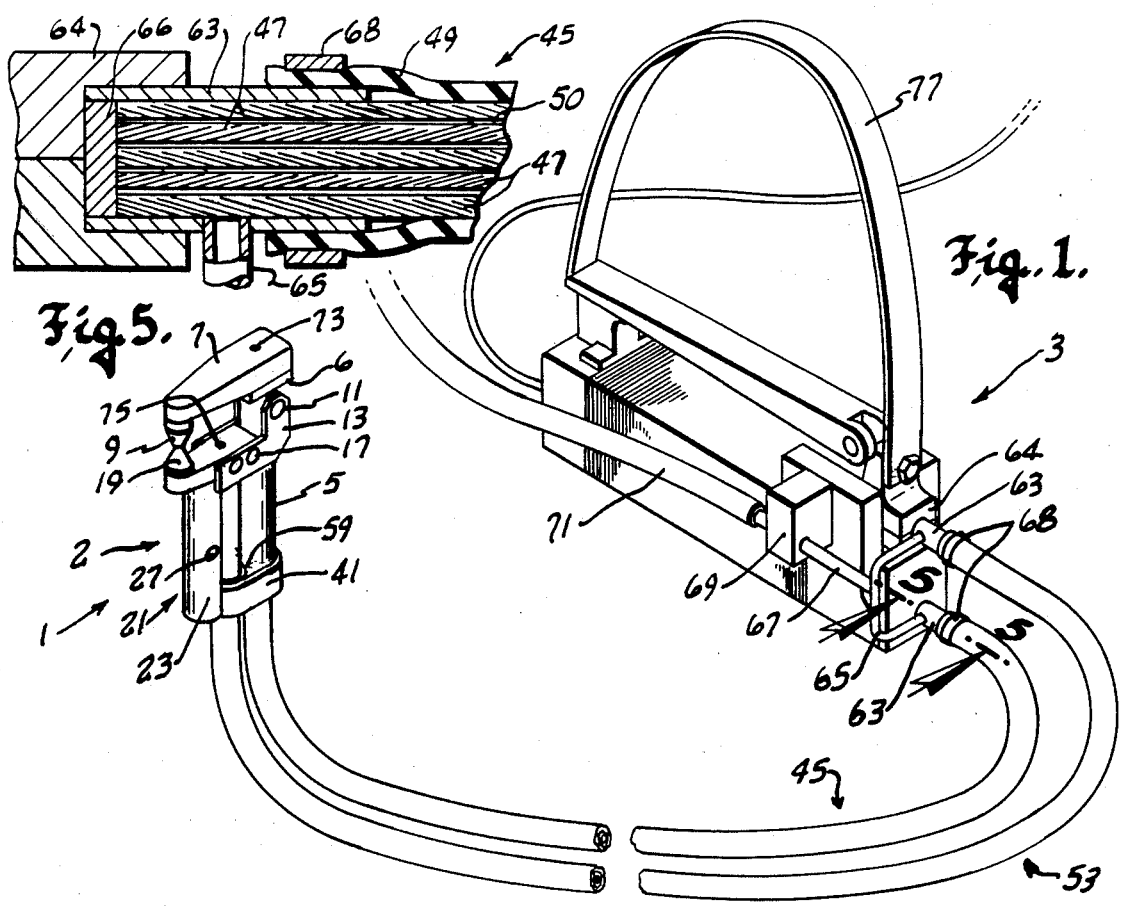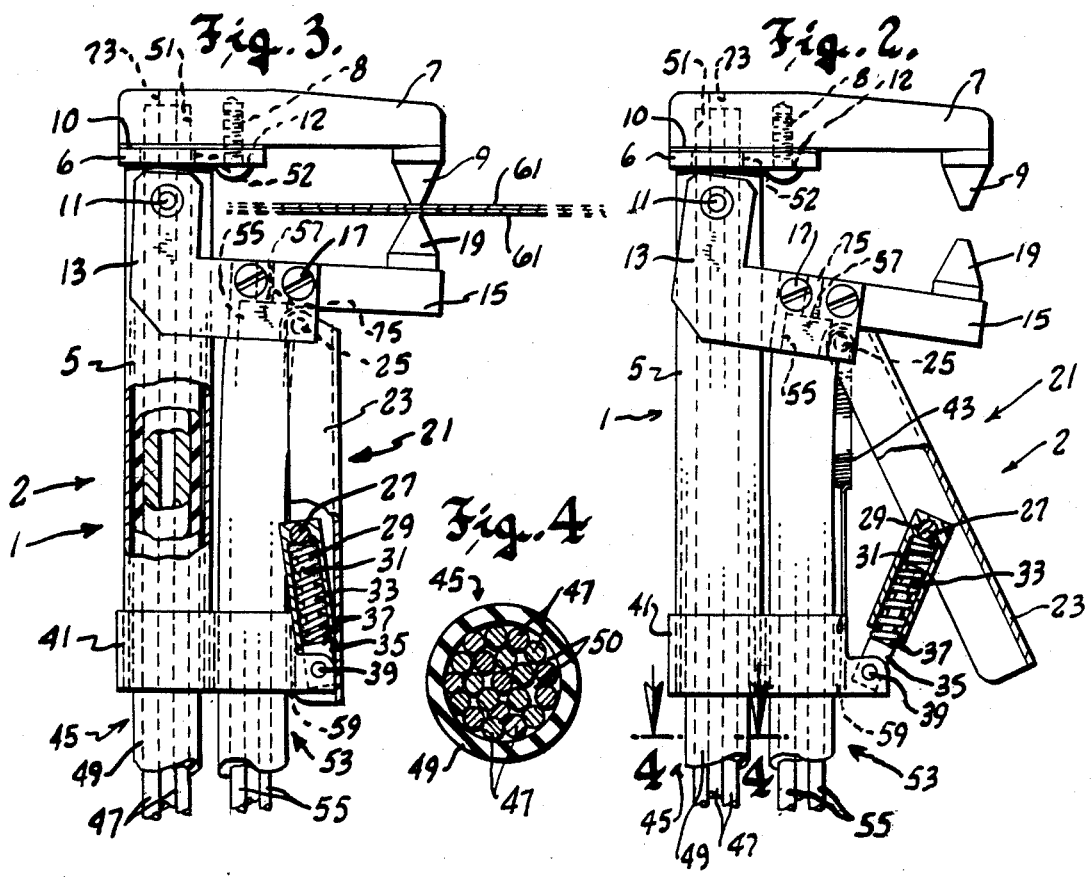

SPOT WELDER WITH ELECTRODE CLAMP

BACKGROUND OF THE INVENTION

1. Field of the Invention.

This invention pertains to welding apparatus, and more particularly to portable apparatus suitable for welding sheet metal work pieces.

2. Description of the Prior Art.

It is well known to join two pieces of sheet steel or other metal by means of electrical spot welding and brazing. For example, the Miller Electric Company, Appleton, Wis., manufactures a spot welding machine having rigid tongs extending therefrom that serve as holders for the welding electrodes. Spot welders are especially useful in the motor vehicle repair industry for welding body replacement panels. However, prior spot welders involve various hazards and do not provide consistent results. The prior welders are of only limited application; they are too heavy, bulky, and difficult to manuever for use under an automobile. Also, prior welders used for automobile repair tend to burn the automobile primer and create a slag that must be ground off, thereby requiring wasteful cleanup time.

Sheet metal parts may be brazed or welded together with oxygen-acetylene torches, but such torches are inconvenient to use in many locations on a motor vehicle. In addition, torches present a fire hazard because of the presence of vehicle upholstery and gasoline. They also are hazardous to the operator.

Wire welders are known, but they have only limited application, because holes must be drilled in the parts and a button or plug welding technique must be used. After welding, the remaining button of weld material must be ground off. Also, the parts must be clean and free of rust. Wire welders have a high potential for burning upholstery, painted surfaces, and the operator with the very hot sparks produced. The sparks are especially hazardous due to the presence of various volatile solvents found in automobile repair shops.

Prior spot welders are further handicapped by the lack of suitable cooling to the electrodes, although cooling means are known. For example, U.S. Pat. No. 1,534,688 shows a gas cooled electric welding device. The device includes a flexible coupling having a tube portion joined to a holder in which is mounted an electrode. The flexible coupling is specifically designed to conduct air and thus adds undesirable expense to the welding device. Moreover, projecting coolant directly at the electrode, as in the U.S. Pat. No. 1,534,688, may overcool the electrode and thus increase the welding time.

Another disadvantage of prior spot welders is the difficulty in accurately controlling the electrode clamping pressure on the work parts on a repeated basis. If the clamping pressure is too great, the electrodes will deform. Also, heat will be conducted too rapidly from the electrodes and thus increase the welding time required and produce poor welds. Too little clamping force results in poor electrical conductivity, which produces poor welding results.

Thus, a need exists for a versatile spot welder that accurately and precisely controls the clamping pressure and temperature variables associated with the welding operation.

SUMMARY OF THE INVENTION

In accordance with the present invention, a lightweight and portable spot welder is provided that grips work parts with a predetermined force for conveniently and rapidly spot welding the parts together. This is accomplished by apparatus that includes a compact hand-held welding clamp assembly connected by flexible electrical cables to a welding transformer. The hand-held assembly includes a frame for supporting a fixed electrode and a clamp mechanism for positioning a movable electrode relative to the fixed electrode.

In addition to supporting the fixed electrode, the frame also supports the clamp mechanism, which may include a toggle. An arm is pivotally connected to the frame. The arm has a jaw attached to the free end thereof, and the jaw supports the movable electrode. The arm pivots so that the movable electrode may be moved into and out of clamped operational relationship with the fixed electrode through actuation of the toggle. To aid in maintaining the electrode in the operational position during welding, the toggle has a spring loaded over-center action.

The fixed electrode is secured to a fixed electrically conductive jaw that preferably extends at a right angle from the assembly frame and that is electrically insulated from the rest of the clamp assembly. The frame is hollow, and a first multi-conductor insulated electrical cable passes through the frame interior. The insulation is stripped from the cable at the junction of the frame and fixed jaw, and the conductors are tightly gripped by the jaw. A second multi-conductor insulated electric cable is tightly gripped within the movable jaw. The second insulated cable passes loosely through the clamp frame so as to not restrict the movement of the movable jaw during pivotal motion thereof.

Upon actuating the toggle, the movable electrode swings into substantially coaxial operational position with respect to the fixed electrode. The present invention is designed and manufactured so that the force between the electrodes in the clamped operational position is preset to a predetermined amount that may be dependent on the work piece characteristics. The clamp forces is precisely repeatable without any control or skill by the user. Accordingly, the pressure exerted on the different sets of parts to be welded ensures uniformly acceptable welds.

Further in accordance with the present invention, the electrodes and the electrical cables between the electrodes and welder transformer are cooled in an inexpensive and simple manner. Air is supplied to the fixed and movable jaws by means of conduits contained within the cables. The conduits are created by the spaces between the cable conductors within the insulation sheath. The fixed and movable jaws are formed with passageways that permit the air pumped through the cables to escape into the atmosphere. Heat from the electrodes and conductors is conducted therefrom through the jaws to the atmosphere. Air may be supplied to the cables from a conventional compressor through a T-type coupling that connects the two cables with the compressor. Preferably, the T-coupling is connected to the cables at the welder transformer. It is the cooling of the electrodes and conductors that permit the clamp assembly of the present invention to be held comfortably without requiring gloves. Further, the power losses in the conductors are greatly reduced by cooling them.

Other objects and advantages of the invention will become apparent to those skilled in the art from the disclosure.

BRIEF DESCRIPTION OF THE DRAWINGS

FIG. 1 is a perspective view of the spot welder of the present invention;

FIG. 2 is an enlarged side view, partially in section, of the hand-held electrode clamp of the present invention shown in an open configuration;

FIG. 3 is an enlarged side view, partially in section, of the hand-held electrode clamp shown in the closed operational position;

FIG. 4 is an enlarged cross-sectional view taken along lines 4—4 of FIG. 2; and

FIG. 5 is an enlarged cross-sectional view taken along lines 5—5 of FIG. 1.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, a compact and portable spot welder 1 is illustrated that includes the present invention. The spot welder is particularly useful for performing spot welding operations on motor vehicle body panels. However, it will be understood that the invention is not limited to automotive applications.

The spot welder 1 is comprised of a hand-held electrode clamp assembly 2 and a welding transformer apparatus 3. Referring to FIG. 2, the hand-held electrode clamp assembly 2 includes a hollow frame member 5 to one end of which is attached, as by welding a plate 6. A fixed jaw 7 is secured to the plate 6 by one or more screws 8. The jaw 7 is electrically insulated from the plate 6 and frame 5 by a piece of insulating fish paper 10 placed between the plate and frame, and also by insulating washers 12 placed under the heads of the screws 8. Adequate clearance with the plate is provided around the peripheries of the heads and shanks of the screws 8. A fixed electrode 9 is fastened to the free end of the jaw 7.

Pivotally mounted to the frame 5 by a pin or rivet 11 is an arm 13. A movable jaw 15 is mounted to the arm 13 by fasteners 17. A movable electrode 19 is fastened to the outboard end of the jaw 15. To position the movable electrode 19 into and out of coaxial operational relationship with the fixed electrode 9, a clamp mechanism is employed. In the illustrated construction, the clamp mechanism is a toggle 21 that includes a lever 23 pivotally connected at one end to the jaw 15 by a pin 25. Spaced from the second end of the lever 23 is a pin 27 that pivotally secures an elongated hollow cap 29 to the lever. Received in the cavity of the cap 29 is a spring 31 that fits over a turned down portion 33 of toggle rod 35 and abuts the toggle rod shoulder 37. The rod 35 is pivotally connected to the frame 5 by a pin 39 fixed in an oval shaped sleeve 41 that is rigidly secured to the frame. To bias the electrode clamp to the open position of FIG. 2, one or more springs 43 are hooked between the pin 25 and sleeve 41.

Electric current is supplied to the fixed electrode 9 by means of a first insulated electric cable 45. The electric cable 45 is composed of a plurality of flexible electrical conductors 47, each of which, in turn, may be composed of a number of smaller wires. The conductors 47 are surrounded by a sheath of insulation material 49, as is well known. The fixed arm 7 is formed with a counterbore 51 that is aligned with an opening 52 through the plate 6 so as to communicate with the interior of the frame member 5. The diameter of the counterbore 51 is such that the periphery of the bundle of conductors 47 fits therein. The cable is inserted through the frame member 5 and plate 6, after the insulation 49 is stripped from the end of cable 45 and the conductors are inserted into the counterbore 51, where they are held firmly in place by any suitable means, such as soldering. In a similar manner, electric current is supplied to the movable electrode 19 by a second insulated cable 53 that is substantially identical with cable 45. The end of cable 53 is stripped of insulation 49, and the conductors 55 are tightly gripped in and soldered to the movable jaw counterbore 57. The cable 53 is loosely guided in the electrode clamp assembly 2 by a ring 59 attached between the interior walls of the sleeve 41.

FIG. 2 shows the electrode clamp 2 of the present invention in the open inoperative configuration. To close the electrode clamp to the closed operational configuration of FIG. 3 to spot weld two sheet metal work pieces 61, the toggle 21 is actuated by rotating lever 23 clockwise with respect to FIGS. 2 and 3. Such rotation brings the pins 27 and 39 closer together, thereby compressing spring 31 between the cap 29 and rod shoulder 37. Rotating the lever also causes the movable arm 13 to rotate counterclockwise with respect to FIGS. 2 and 3. The lever is stopped in the substantially vertical attitude shown in FIG. 3 by the external surface of sleeve 41. In that position, the electrodes 9 and 19 are substantially coaxial.

It is a feature of the present invention that the electrodes exert a clamping pressure on the work pieces 61 that is dependent only on the compression force in spring 31. It has been found that a clamp pressure of about 1,600 lbs. per square inch on the work piece is satisfactory.

That pressure provides good electrical contact, but it is not so high as to deform the electrode tips or cause the welding heat generated to be conducted too rapidly from the electrodes. With the desired clamp pressure known, it is an easy design task to choose a spring that, acting through the dimensions of the various parts of the clamp mechanism produces sufficient force when compressed to the position of FIG. 3, to create the desired pressure on the work pieces. The clamping pressure is substantially constant even with work pieces of varying thicknesses. The application of a constant clamp pressure to different thickness work pieces is possible because the cable 53 is slidable within the ring 59 as the movable jaw opens and closes, and because the clamp pressure is created by the compression of spring 31. Thus, in FIG. 3, the work pieces 61 may be of greater or lesser thickness than those shown. In either case, the sliding cable 53 permits the movable jaw to close and the electrodes to grip the work pieces with a force that is dependent only on the compression force in the spring 31. Within the range of the jaw opening, which in one embodiment is a maximum of about 0.100 inches, the variation in clamping pressure with work piece thickness is negligible.

Because of the design of the present invention, the clamp pressure on the work pieces is consistently repeatable without any skill required of the operator.

With the lever in the vertical position of FIG. 3, the pin 27 lies on the opposite side of a line connecting the pins 25 and 39 as the pin was in the open configuration of FIG. 2. Thus, the toggle is in an over-center condition to lock the electrodes in the closed configuration. With the work pieces clamped by the electrodes as shown in FIG. 3, the transformer apparatus 3 (FIG. 1) may be energized to spot weld the parts. Thereafter, the lever 23 is rotated counterclockwise with respect to FIGS. 2 and 3 to release the work pieces from the electrodes.

Further in accordance with the present invention, the hand-held assembly 2 and the conductors 47 and 55 are cooled in a simple and inexpensive manner. Cooling the hand-held assembly is important to operator comfort and safety. Cooling the conductors is important to minimize power losses through the conductors. Referring to FIG. 4, it will be noticed that the conductors 47 do not fill the entire area inside the insulation sheath 49. Thus, passageways 50 are available inside the sheath for conducting air. Referring to FIGS. 1 and 5, the air is supplied to the cables 45 and 53 by means of air inlet sleeves 63. The end of each cable is stripped of insulation 49 near the respective junction with the welding apparatus 3. The exposed conductors 47 of each cable are inserted into a sleeve 63 which is squashed between a squash plate and block 64, which securely tighten the conductors mechanically and electrically to the welding apparatus. To prevent air leakage out of the end of the cable, the end of the sleeve 63 is soldered to the bundle of conductors 47 around the periphery thereof, as indicated by reference numeral 66. The end of the cable insulation 49 is stretched over the outer end of the sleeve 63 and is held in place thereon by a conventional clamp 68. To each inlet sleeve 63 is joined one end of a U-shaped tube 65 that communicates with the cable conductors by means of a hole through the inlet sleeve walls as shown in the figures. An air tube 67 is joined to the tube 65. The tube 67 may be mounted on the welding apparatus 3 by a block 69 of any suitable configuration. A flexible hose 71 supplies air under pressure from a conventional compressor, not illustrated in FIG. 1.

To permit the air in the cables 45 and 53 to cool the electrodes 9 and 19, respectively, the jaws 7 and 15 are formed with air passages 73 and 75, respectively. See FIGS. 1, 2, and 3. The passage 73 terminates in the counterbore 51, and the passage 75 terminates in the counterbore 57. Thus, air from the compressor flowing through the cables absorbs heat from the conductors 47 and 55 and the heat from the electrodes that flows through the jaws to the respective air passages. It has been determined that an air pressure of about 70 lbs. per square inch provides excellent cooling results. At that pressure, the cable insulation 49 stretches a slight amount to expand slightly away from the conductors, thus providing additional area through which the cooling air flows. As a result, even with continuous use, the clamp assembly 2 is cool to the touch.

To provide maximum heat conduction, the jaws and electrodes are preferably made of copper. The remaining parts of the electrode clamp assembly 1 are preferably of a series 300 non-magnetic stainless steel so as to provide high strength and durability with light weight.

Referring back to FIG. 1, the hand-held assembly 2 is flexibly connected to the welding transformer apparatus 3 by the electrical cables 45 and 53. The spot welder 1 is thus usable in relatively inaccessible places, such as under a motor vehicle, where it is very difficult to position conventional spot welding apparatus. To enhance portability and convenience of the entire welding unit, the transformer apparatus may be provided with a shoulder strap 77. It will be appreciated that the availability of the simple and effective cooling system is important to the portability and versatility of the hand-held electrode clamp assembly.

It will be understood that reference numerals 61 in FIG. 3 may represent a wide variety of applications for spot welding by the apparatus 1 of the present invention. For example, the parts may represent various combinations of automotive sheet metal parts, such as a fender or quarter panel and a wheel house, a quarter panel and a floor panel extension, door pillar superstructures, or trunk opening superstructures. The parts may also represent gutters. Further, although two parts are shown, more than two parts may be clamped between the electrodes 9 and 19 for being welded together.

Thus, it is evident that there has been provided, in accordance with the invention, a spot welder with electrode clamp that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. A hand-held electric welding assembly for welding work pieces comprising:
   a. a hollow frame member having first and second ends;
   b. a fixed jaw having a first end fastened at generally right angles to the first end of the hollow frame member and a second end bearing a first electrode;
   c. a sleeve fastened to the second end of the hollow frame member;
   d. an arm pivotally attached to the first end of the hollow frame member, the arm bearing a second electrode;
   e. toggle means connected to the arm and to the sleeve for pivoting the arm to swing the second electrode into and out of operational engagement with the work piece and the first electrode;
   f. a first multi-conductor insulated electrical cable affixed to the fixed jaw first end and passing through the hollow frame member; and
   g. a second multi-conductor insulated electrical cable affixed to the arm and lying parallel to and adjacent the hollow frame member and passing loosely through the sleeve,
   so that moving the arm by the toggle means causes the second electrical cable to slide relative to the first electrical cable.

2. The hand-held electrical welding assembly of claim 1 wherein the toggle means comprises spring means for producing a substantially constant predetermined working pressure on workpieces of varying thickness.

3. The hand-held electrical welding assembly of claim 1 wherein:
   a. the fixed jaw and arm are formed with respective counterbores for receiving the inner wires of the first and second electrical cables, respectively;
   b. the fixed jaw and arm define respective air passages extending from the counterbores to the exteriors of the fixed jaw and arm to provide communication of the inner wires of the first and second electrical cables with ambient air; and c. an air supply is connected to the distal ends of the electrical cables to force air through the electrical cables and through the air passages in the fixed jaw and arm, so that the air cools the electrical cables and electrodes.

4. The hand-held electrical welding assembly of claim 3 further comprising:

a. an electrical transformer adapted to mechanically and electrically secure the inner wires of the distal ends of the electrical cables;

b. a supply of compressed air; and c. air inlet means mounted to the transformer for commonly connecting the electrical cables to the air supply for forcing air through the electrical cables and to the electrodes.

5. The hand-held electrical welding assembly of claim 4 wherein the air inlet means comprises:

a. a sleeve surrounding and clamping the inner wires of each electrical cable, the sleeves being firmly electrically and mechanically connected to the transformer, the sleeves extending along the inner wires and being partially covered by electrical cable insulation, each sleeve having a wall that defines a passage therethrough; and b. an air inlet tube connecting the sleeve passages to the air supply, so that air from the air supply flows through the air inlet tube, through the sleeve passages, and thence through the interior of the electrical cables to the first and second electrodes.

* * * * *